(12) United States Patent
Shi et al.

(10) Patent No.: US 9,112,771 B2
(45) Date of Patent: Aug. 18, 2015

(54) SYSTEM AND METHOD FOR CATCHING TOP HOSTS

(75) Inventors: Xingang Shi, Hong Kong (CN); Dah-Ming Chiu, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 1045 days.

(21) Appl. No.: 13/148,013

(22) PCT Filed: Feb. 5, 2010

(86) PCT No.: PCT/CN2010/070553
§ 371 (c)(1),
(2), (4) Date: Sep. 28, 2011

(87) PCT Pub. No.: WO2010/088861
PCT Pub. Date: Aug. 12, 2010

(65) Prior Publication Data
US 2012/0030348 A1    Feb. 2, 2012

Related U.S. Application Data

(60) Provisional application No. 61/150,698, filed on Feb. 6, 2009.

(51) Int. Cl.
*G06F 15/173* (2006.01)
*H04L 12/26* (2006.01)
*H04L 29/06* (2006.01)

(52) U.S. Cl.
CPC .......... *H04L 43/022* (2013.01); *H04L 63/1425* (2013.01); *H04L 43/024* (2013.01); *H04L 43/026* (2013.01); *H04L 43/028* (2013.01)

(58) Field of Classification Search
CPC .. H04L 63/1254; H04L 43/022; H04L 43/026
USPC ..................................... 709/224; 726/22–25
See application file for complete search history.

(56) References Cited

U.S. PATENT DOCUMENTS 6,061,331 A * 5/2000 Conway et al. ............... 370/232
6,560,198 B1 * 5/2003 Ott et al. ....................... 370/235
7,768,921 B2 * 8/2010 Nakil et al. ................... 370/235
(Continued)

FOREIGN PATENT DOCUMENTS

CN        1744532 A       3/2006
CN        1901545 A       1/2007

OTHER PUBLICATIONS

Lee et al., A Methodology for Finding Significant Network Hosts, 2007, IEEE.*
(Continued)

*Primary Examiner* — Chirag R Patel
*Assistant Examiner* — James Conaway
(74) *Attorney, Agent, or Firm* — Fish & Richardson P.C.

(57) ABSTRACT

Disclosed are a system and a method for catching top users. The system may comprise: a filter (10) configured to sample flows from the hosts and remove the flows not satisfying a constraint; an tracker (20) configured to record a first estimated flow count for each host and to determine a first set of hosts from the plurality of hosts in term of the estimated flow count; and an estimator (30) configured to determine a second estimated flow count for each of the determined hosts and select a second set of hosts from the determined hosts based on the second estimated flow count.

18 Claims, 8 Drawing Sheets

(56) References Cited

U.S. PATENT DOCUMENTS

| | | | |
|---|---|---|---|
| 8,681,628 B2* | 3/2014 | Shi et al. | 370/235 |
| 2005/0249214 A1 | 11/2005 | Peng | |
| 2008/0052774 A1* | 2/2008 | Chesla et al. | 726/13 |
| 2008/0101234 A1* | 5/2008 | Nakil et al. | 370/235 |
| 2008/0123545 A1* | 5/2008 | Watanabe et al. | 370/252 |
| 2008/0267068 A1* | 10/2008 | Lakshman et al. | 370/235 |
| 2009/0028046 A1* | 1/2009 | Kanda et al. | 370/235 |
| 2009/0303879 A1* | 12/2009 | Duffield et al. | 370/235 |
| 2009/0303892 A1* | 12/2009 | Yamasaki | 370/252 |
| 2010/0157840 A1* | 6/2010 | Sen et al. | 370/253 |
| 2011/0170413 A1* | 7/2011 | Shi et al. | 370/235 |
| 2012/0151593 A1* | 6/2012 | Kang et al. | 726/25 |
| 2012/0290711 A1* | 11/2012 | Upham et al. | 709/224 |

OTHER PUBLICATIONS

Lee et al., Host Measurement of Network Traffic, 2007, IEEE.*
International Search Report for PCT/CN2010/070553 mailed May 13, 2010, Authorized Officer Wang Yan.

* cited by examiner

SYSTEM AND METHOD FOR CATCHING TOP HOSTS

CROSS REFERENCE TO RELATED APPLICATIONS

This application is a United States National Phase application of PCT/CN2010/070553 filed Feb. 5, 2010 that claims the benefit of U.S. Provisional Application No. 61/150,698 filed on Feb. 6, 2009, of which the contents are incorporated herein by reference in its entirety.

TECHNICAL FIELD

The present application relates to a system and a method for catching top hosts in the network.

BACKGROUND

Efficiently and accurately identifying hosts that are spreading the largest amount of flows during an interval of time is very important for managing a network and studying host behaviors on application level, ranging from detecting DDoS attack, worm propagation, peer-to-peer hot spots and flash crowds. No previous work has been able to efficiently and accurately identify the top spreaders at very high link speed, for example, 10 to 40 Gbps.

Considering the case of finding hosts who are spreading a large amount of flows, FIG. 1 shows a scenario: hosts in a local ISP network communicate with other hosts in the global Internet through a high speed link. As shown, $host_3$ is communicating with a lot of hosts, and may be a very popular web server, or may be initiating or under DDoS attack. It is required to quickly and efficiently identify such kind of hosts in a network, and know how severe the situation is.

There has been a lot of works on measurement of traffic statistics for network management, security, and its evolvement. The size distribution and matrices of flows from the hosts may help a network to provide and engineer traffic thereof. Finding flows that have a large number of packets is useful in billing and accounting. It has also been shown that flow level communication patterns may further reveal application level behaviors of each host.

Typically, flows of small sizes are more interesting to security related problems. For example, a host scanning a port or address typically sends only a very small number of packets to each victim, to keep the overhead small and lower the chance to be detected. A SYN flood DDoS attack typically contains only one SYN packet in each attack flow, and the acknowledged ACK packets are ignored. A newly exposed TCP attack uses many low rate TCP sessions to exhaust resources of the victim, and during a small interval, these TCP flows can also be viewed as small flows. P2P applications tend to contact some servers or other peers to exchange control information in a periodical fashion, and such control messages typically contain a small number of packets.

Currently, there are some problems of detecting super hosts with small flows in the field.

SUMMARY

In one aspect, a system for catching top hosts from a plurality of hosts may comprise:
a filter configured to sample flows from the hosts and remove the flows that not satisfying a first constraint;
a tracker configured with a data structure for recording a first estimated flow count for each host and configured to determine a first set of hosts from the plurality of hosts in term of the estimated flow count; and
an estimator configured to determine a second estimated flow count for each of the determined hosts and select a second set of hosts from the determined hosts based on the second estimated flow count.

In the other aspect, a method for catching top hosts from a plurality of hosts may comprise:
sampling a plurality of packets from the hosts during a determined interval of time;
determining a difference between a count and a count error for each of the hosts based on the sampled packets;
ranking the hosts based on the determined difference to identify a first set of hosts in the ranked hosts;
estimating a flow count for each of the first set of hosts; and
selecting a second set of hosts from the first set of hosts as the top hosts based on the estimating.

DETAILED DESCRIPTION

Hereinafter, a detailed description of implementations will be given with reference to the appended drawings and embodiments.

For the purpose of description, the following definitions are given first.

A scanner is defined as a host or a port on a host, acting as a "user" that is communicating with other hosts or ports. In the application, there is almost no difference when handling the two situations, except whether the user ID comes from the IP address or the IP address together with the port number. Hereinafter, the former case is used to discuss the embodiment of the application.

A flow is defined as a combination of fields in a packet, for example, IP address, port, TCP flags, or even packet content.

Different applications may have interests in different fields, and the unique combination of these fields forms a flow ID. In the application, the flows of size i are considered, where i is a small integer. Such flows are referred as small flows. For ease of discussion, the flows of size 1, as referred as singleton flows, are used to describe the embodiments of the application.

A scanner or user is super in terms of the number of its singleton flows. A scanner or user is top if and only if its singleton flow count is above a threshold. Although finding all users with singleton flow counts above a threshold can be useful, in practice, it is hard to find an appropriate threshold to classify the users. For example, given a threshold, there are often either too many or too few users. Only considering ranking based top users may suffer that, from another point, no meaningful results exist at all if all users only have a small number of singleton flows. So, in the application, these two conditions are combined together, and the exact value of a threshold is less important.

Figure 1:
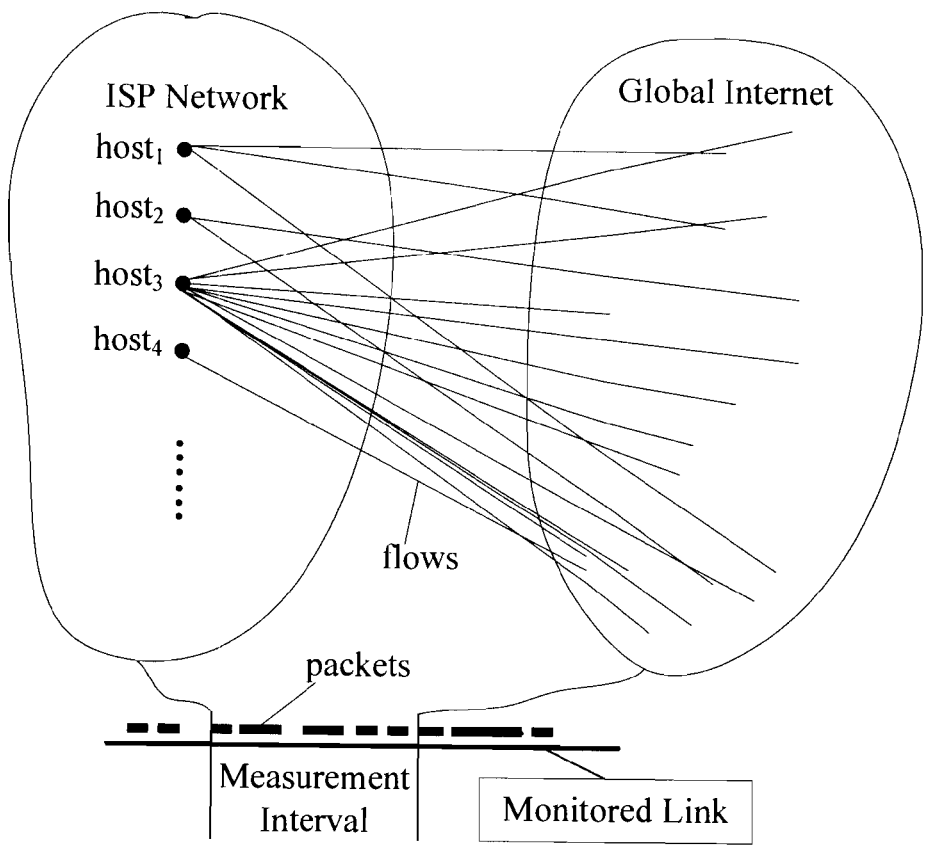
FIG. 1 is a diagram illustrating a communication scenario for hosts in the prior art.
Figure 2:
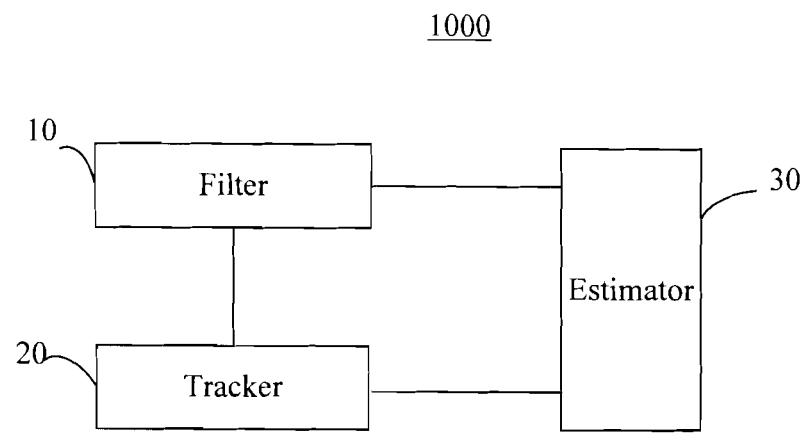
FIG. 2 is a block diagram schematically illustrating the system architecture according to one embodiment of the application.

FIG. 2 schematically illustrates a system 1000 for determining top hosts according to an embodiment of the application. As shown, the system 1000 comprises a filter 10, a tracker 20 and an estimator 30. The filter 10 is configured to sample flows from a plurality of hosts and remove the flows not satisfying a first constraint during a determined interval of time, which will be discussed hereinafter. The tracker 20 is configured with a data structure for recording a first estimated flow count for each of the hosts and configured to determine a first set of hosts (for example, the top-2k hosts) from the plurality of hosts in term of the estimated flow count. The estimator 30 is configured to determine a second estimated flow count for each of the determined hosts and select a second set of hosts (for example, the top-k hosts) from the determined hosts based on the determined second flow counts. k is a small number, e.g. 10 or 20, which is most useful for network management and security.

1. Filter 10

Figure 3:
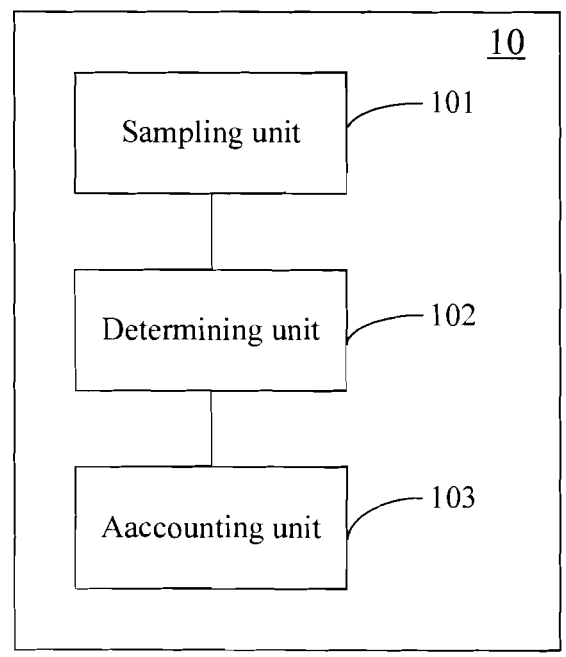
FIG. 3 is a block diagram schematically illustrating the filter of FIG. 2 according to one embodiment of the application.

As shown in FIG. 3, the filter 10 is configured with a sampling unit 101, a determining unit 102 and an accounting unit 103. The sampling unit 101 operates to sample the arrival packets and to calculate a value of $V_f$ based on the flow ID f of the packets by the following equation:

$$V_f = h(f) \quad 1)$$

Where h( ) is a uniform hash function that may calculate, for example, a hash result of 32 bits.

A plurality of counters are arranged in the accounting unit 103 and are represented mathematically as an array $c[1 \ldots m]$, where each counter has two bits. The determining unit 102 operates to determine whether the calculated $V_f$ is less than a predetermined sampling threshold $T_1$. If yes, this packet is sampled and then the accounting unit 103 checks whether the array $c[1 \ldots m]$ should be updated, which will be discussed in detailed as below. If no, this packet is discarded. If the intended sampling rate is r and the output range of h( ) is from 1 to H, then $T_1$ should be set to rH, such that one out of 1/r flows is sampled. The sampling rate r should be inversely proportional to the link speed. For example, on high speed links such as OC768, r can be set to 1/16, while on links with speed of or less than OC48, r can be set to 1.

At beginning of the sampling, all counters of $c[1 \ldots m]$ are set to be zero, so that each counter in array $c[1 \ldots m]$ may record up to three. Packets of the same flow f are mapped to the same position $l=h_m(f)$, where $h_m(\ )$ can calculate a hash result in the range from 1 to m, and can be a prefix of h( ) in implementation. The element e[l] is used to record the number of packets already mapped to this position. In particular, we use $c_t$ to represent the counters in the filter 10 when seeing the t-th sampled packet and assuming the packet is from host s. If $c_t[l] \leq 1$, then the accounting unit 103 sets $c_{t+1}[l] = c_t[l] + 1$.

When considering small flows of no more than q packets, the accounting unit 103 sets $c_{t+1}[l] = c_t[l] + 1$ when $c_t[l] \leq q$, and each counter needs at least $\lceil \log_2(q+2) \rceil$ bits where $\lceil x \rceil$ means the smallest integer no smaller than x.

2. Tracker 20

Figure 4:
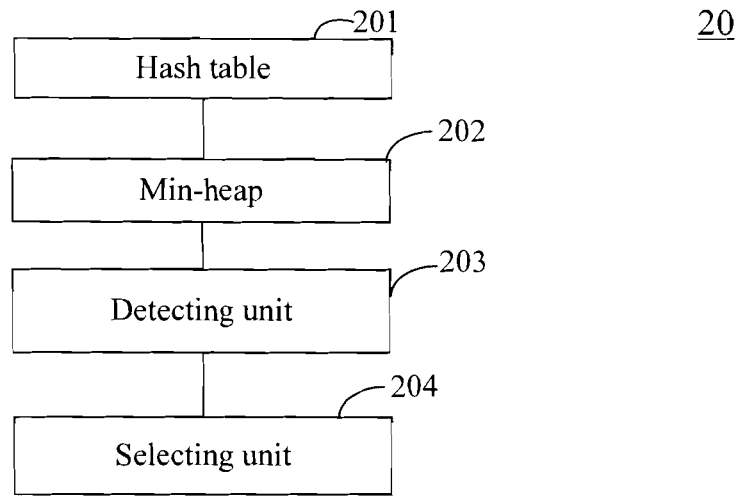
FIG. 4 is a block diagram schematically illustrating the tracker of FIG. 2 according to one embodiment of the application.
Figure 5:
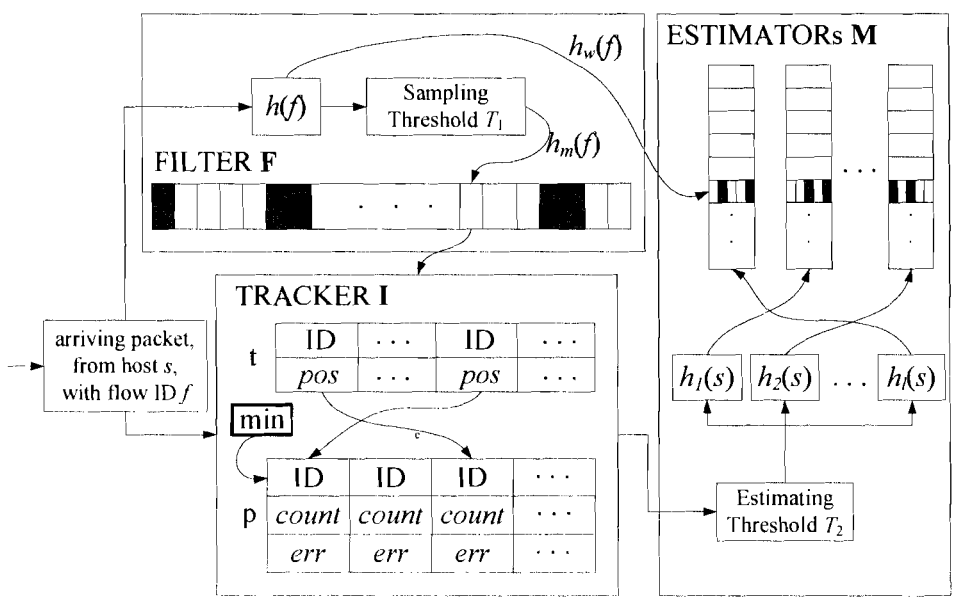
FIG. 5 schematically illustrates a data structure of system of FIG. 2 according to one embodiment of the application.

Referring to FIG. 4, the tracker 20 maintains a hash table 201 and a min-heap 202. The key of a node in the hash table 201 is host ID (i.e. parameter s), and the value of a node in the hash table 201 is the corresponding position of the node in the min-heap 202. As shown in FIG. 5, a node in the min-heap 202 has three fields, its host ID, its count (not necessary to be an integer), and its possible error of count err. The count and err of s in the min-heap 202 act as a coarse estimation for the flow count of s. In the min-heap 202, at most z nodes are kept for z different hosts. The count's and err's in the min-heap 202 may also be represented as two arrays $count[1 \ldots z]$ and $err[1 \ldots z]$ for efficient implementation.

The counter number z should be set to $$z = \min\left(|A|, \left\lceil \frac{n}{T} \right\rceil\right),$$

where |A| is the number of hosts and n is the total number of flows, and T is the threshold such that hosts with more than T singleton flows are considered to be "super". For each update, the worst case processing time is O(log z). Since z is very small, the hash table 201 can be stored in a TCAM with O(1) performance. For strict time requirement, sampling in the filtering 10 may reduce processing overhead.

As shown in FIG. 4, the tracker 20 is also provided with a detecting unit 203 for detecting the change of the counter values in the accounting unit 103. Specifically, when c[l] (where $l = h_m(f)$) in the accounting unit 103 is changed, the field of count in the min-heap 202 may be updated accordingly. In particular, for each update for host s triggered by the filter 10, if s is not kept in the ID field of the table 201 and the min-heap 202, the ID with the minimal count (let min be this value) in the min-heap 202 and table 201 is replaced by s, the corresponding count in the min-heap 202 is updated as below, and the corresponding err is set as $err_s = min$. However, if s is already kept in the ID field of the table 201 and the min-heap 202, only the count of s (that is $count_s$) is updated as below.

When the t-th packet with host ID s and flow ID f arrives, and $c_t[h_m(f)]$ in the accounting unit 103 is changed, $$\text{If } c_t[h_m(f)] = 0, count_s = count_s + \frac{m}{y_0(t)} \times \left(\frac{y_1(t)}{y_0(t)} + 1\right) \quad 2)$$

$$\text{If } c_t[h_m(f)] = 1, count_s = count_s - \frac{m}{y_0(t)}$$

where m represents the number of counters in the filter 10, and $y_0(t)$ and $y_1(t)$ are the number of counters in $c_t$ with value 0 and 1 respectively. Herein the value of counts is the flow count of host s.

Figure 6:
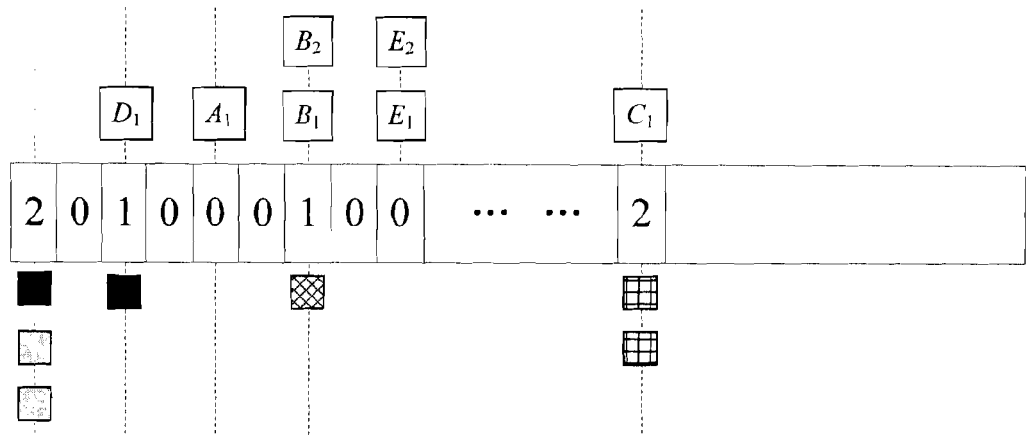
FIG. 6 is a diagram illustrating a typical scenario for the using of the filter of FIG. 2.

Taking FIG. 6 as an example, for the 2-bits counter values, since only 0 and 1 are useful for estimating singleton flow count, the application uses 2 to mean any value large than 1, while 3 is not used. Gray squares represent packets that have arrived, and squares with characters represent forthcoming packets. Different gray levels or characters represent different flows. Although each is the first packet of a flow, $A_1$ and $E_1$ see a value of 0, but $B_1$ and $D_1$ see a value of 1, and $C_1$ sees a value of 2. As the second packet of a flow, $B_2$ will see a value of 2, but $E_2$ will see a value of 1.

When considering small flows that have no more than q packets, equation 2) should be changed accordingly to:

If $c_i[h_m(f)]=i$ and $i \le q$, $count_s = count_s + U_{i,q}(t)$  (3)

where $U_{i,q}(t)$ is determined by i, q, $y_0(t), \ldots, y_q(t)$, m. The counter in the filter 10 should be at least $\lceil \log_2(q+2) \rceil$ bits where $\lceil r \rceil$ means the smallest integer no smaller than x. The exact formulas for computing $U_{i,q}(t)$ are provided as equation 8) in the mathematical proof.

As shown in FIG. 4, the tracker 20 also comprises a selecting unit 204. The selecting unit 204 is configured to rank all of the hosts based on the estimated flow counts, namely $count_s$'s, in a descending or ascending order. The top-2k hosts in the ranked hosts are identified by the selecting unit 204 as potential top spreaders, where k is an integer. Although theoretically, k can be selected from 1 to the total number of hosts, here it only considers the situation where k is a small constant number, e.g. 10 or 20, when the network management and security is concerned.

The detailed architecture with data structures for the filter 10 and tracker 20 are shown in FIG. 5, wherein some units therein are omitted for the purpose of clarity.

3. Estimator 30

Figure 7:
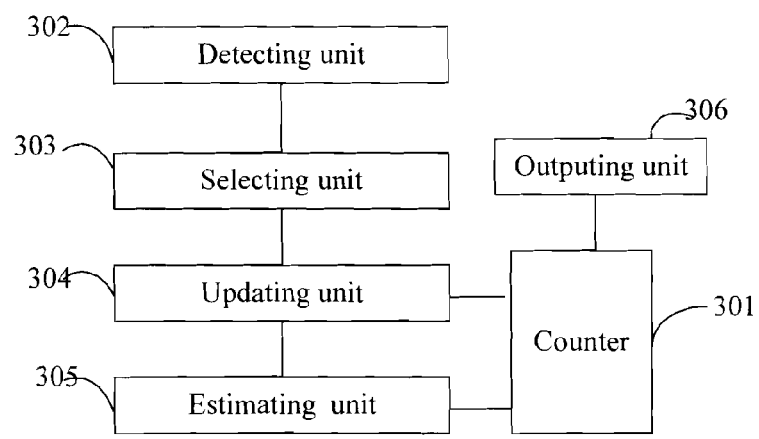
FIG. 7 is a block diagram schematically illustrating the estimator of FIG. 2 according to one embodiment of the application.

The estimator 30 is used to select, for example, top-k hosts from, for example, the top-2k potential top spreader identified by the tracker 20. As shown in FIG. 7, the estimator 30 includes a counter 301 configured with w×d counting units (d columns, each column has w counting units), with each counting unit represented by 2 bits. All of the counting units are initialized to zero. Besides the counter 301, the estimator 30 also includes a detecting unit 302, a selecting unit 303 and an updating unit 304.

Figure 8:
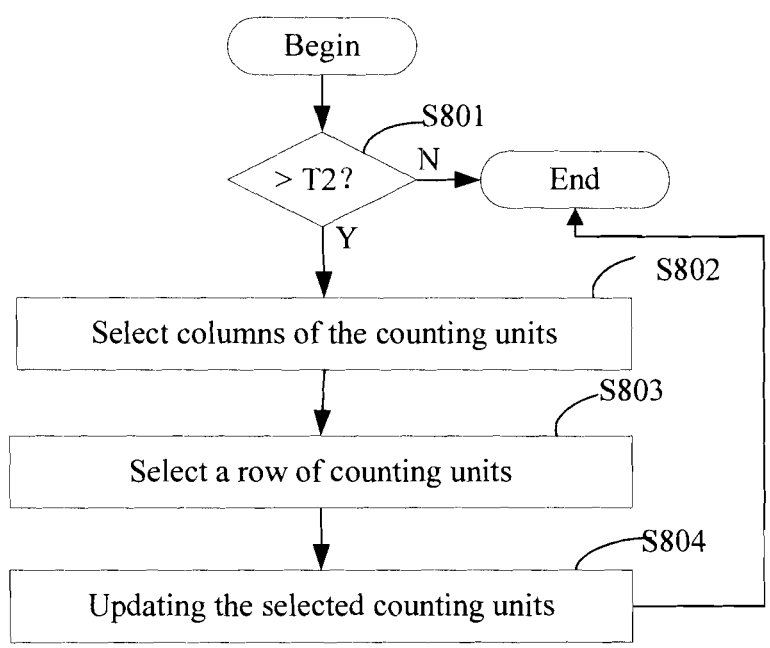
FIG. 8 is a block diagram schematically illustrating the flowchart of updating the estimator of FIG. 2 according to one embodiment of the application.

The detecting unit 302, the selecting unit 303 and the updating unit 304 cooperate to update the counting units in the first counter 301. FIG. 8 illustrates the updating of the first counter 301 according to one embodiment of the application. In step S801, when a packet from host s arrives (notice that different from the filter 10, packets are used with sampling), the detecting unit 302 operates to detect whether s is tracked in the tracker 20 and the coarse flow count of s, that is $count_s - err_s$ in the min-heap 202 of the tracker 20, is above an estimating threshold $T_2$. When the detecting unit 302 detects $count_s - err_s$ in the min-heap 202 of the tracker 20 is above $T_2$, in step S802, it uses for example, 3 hash functions $h_1(s), h_2(s), h_3(s)$ to select 3 columns of counting units from d columns by a rule of $columns_s = h_i(s)$ for $i=1$ to 3  (4)

where $columns_s$ represents the selected columns of the counting units where an input parameter is the host ID s. In the embodiment, for the purpose of illustration, the three columns are denoted as $M_{h1(s)}, M_{h2(s)}$ and $M_{h3(s)}$.

In step S803, the selecting unit 303 operates to select a row of counting units from the selected three columns ($M_{h_1(s)}, M_{h_2(s)}, M_{h_3(s)}$) in the same level. In particular, $f = h_w(f)$ is used to represent the location of row for the selected counting units, where $h_w()$ can calculate a hash result in the range from 1 to w, and can be a prefix of $h()$ in implementation. Now the three counting units $M_{h_1(s)}[l], M_{h_2(s)}[l], M_{h_3(s)}[l]$ are selected.

In step S804, for a new packet from s with flow ID f, the updating unit 304 operates to set the three selected counting units as below.

For i=1 to 3

If $M_{h_i(s)}[l]<=1, M_{h_i(s)}[l]=M_{h_i(s)}[l]+1$  (5)

When considering small flows of no more than q packets, equation 5) should be changed accordingly to If $M_{h_i(s)}[l]<=q, M_{h_i(s)}[l]=M_{h_i(s)}[l]+1$  (6)

Each counting unit in the estimator 30 should be at least $\lceil \log_2(q+2) \rceil$ bits where $\lceil x \rceil$ means the smallest integer no smaller than x.

Referring to FIG. 7 again, the estimator 30 may further comprise an estimating unit 305. The estimating unit 305 is configured to estimate flow counts of the selected 2k hosts.

Figure 9:
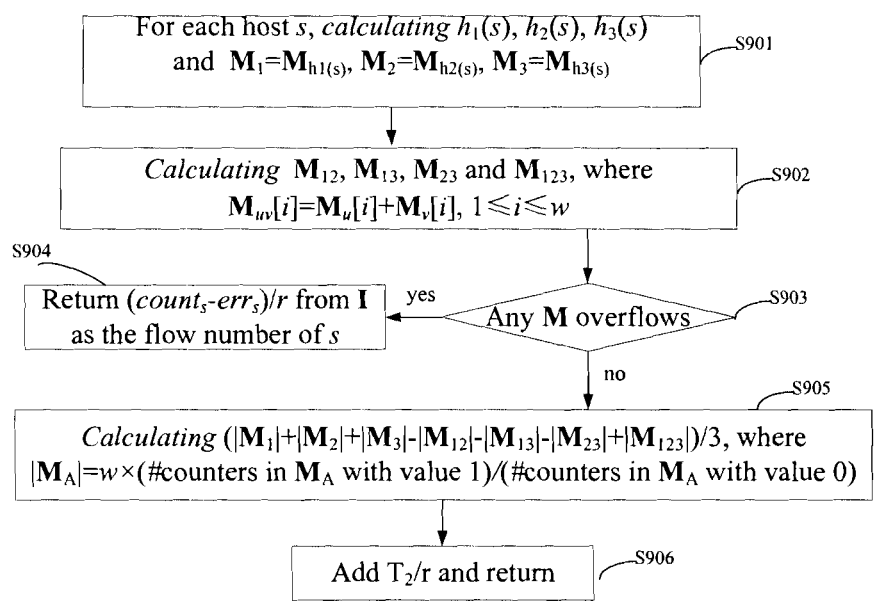
FIG. 9 is a block diagram schematically illustrating the flowchart of the singleton flow count estimation algorithm according to one embodiment of the application.

FIG. 9 illustrates the estimating processing for the estimating unit 305. In this exemplified example, consider the three columns ($M_{h_1(s)}, M_{h_2(s)}, M_{h_3(s)}$) that host s is mapped to and denote them by $M_1, M_2$ and $M_3$ (S901). Then, in step S902, $M_{12}, M_{13}, M_{23}$ and $M_{123}$ are calculated, where $M_{12}[l]=M_1[l]+M_2[l]$, $M_{13}[l]=M_1[l]+M_3[l]$, $M_{23}[l]=M_2[l]+M_3[l]$, and $M_{123}[l]=M_1[l]+M_2[l]+M_3[l]$, for $1 \le l \le w$. In step S903, determine whether any one of $M_{12}, M_{13}, M_{23}$ and $M_{123}$ overflows (it overflows if there is no counting unit with value 0). If yes, we can not use them for estimating, and then in step S904, use $(count_s - err_s)/r$ from the tracker 20 as the flow count of host s. Otherwise, in step S905, a temporarily estimated flow count St is calculated by a rule of $St = (|M_1|+|M_2|+|M_3|-|M_{12}|-|M_{13}|-|M_{23}|+|M_{123}|)/3$,  (7)

where $|M_A| = w \times (\#\text{counters in } M_A \text{ with value } 1)/(\#\text{counters in } M_A \text{ with value } 0)$ and r is the sampling rate for the sampling unit 101.

In step S906, $T_2/r$ is added to St, and the result is used as an estimated flow count for the host s.

When considering small flows with no more than q packets, equation 7) should be changed accordingly. The exact formulas for computing $|M_A|$ and St are provided as equations 9)~15) in the mathematical proof.

Referring to FIG. 7 again, the estimator 30 may further comprise an outputting unit 306. The estimating unit 306 is configured to sort the host IDs in a descending or ascending order based on the estimated flow counts for the hosts and selecting top-k hosts from the top-2k hosts.

As mentioned in the above, the counter number z in the tracker 20 should be set to $$z = \min\left(|A|, \left\lceil \frac{n}{T} \right\rceil\right),$$

where $|A|$ is the number of hosts and n is the total number of flows. By neglecting time for hash computations and update on $y_0$ and $y_1$, it can be seen that for each sampled flow (1 out of 1/r), where r is the rate of sampling, at most two packets can cause update on the filter 10 and the tracker 20, where each update needs at most one read and one write on the filter 10, and $1+\log(z)$ r/w on the tracker 20. And for a small number of hosts, each packet of them needs one read on the tracker 20 and 3 r/w on the estimator 30. The total memory is 2m+240z+2dw bits (for small flows with no more than q packets, the memory required is $\lceil \log_2(q+2) \rceil m + 240z + \lceil \log_2(q+2) \rceil dw$ bits).

For a practical situation such as $n=2^{20}$ and $|A|=20K$, we set $r=1/16$, $m=2^{22}$, c=2000, w=4096 and d=1024, the memory needed is 1148 KB, which can be affordable in SRAM, and the update speed can keep up with 40 Gbps. The identified top-20 scanners are almost always correct, and the flow count estimation at an average relative error of 3%. Using more memory can lead to better performance.

More importantly, the system and the algorithms used therein can perform on very high speed links, with a large number of hosts and flows, e.g. 10 Gbps=40 Gbps, 1M flows and 200K hosts, which is the real situation happening on ISP backbones.

In case that a host has a very large number of flows (e.g. more than w ln(w)), then the estimator 30 may be filled up, and we just use the counter provided by the tracker 20.

Hereinabove, the systems 1000 and the cooperation for the components in the systems have been discussed. Now, some mathematical supports for some of the above equations are given as below.

1. Mathematical Support for Equation 2) and 3)

Figure 10:
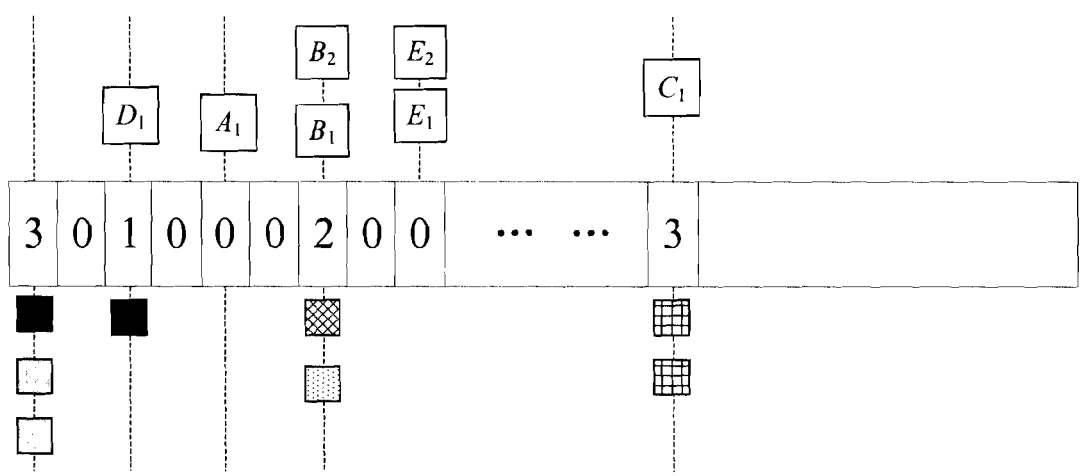
FIG. 10 is another diagram illustrating a typical scenario for the using of the filter of FIG. 2.

We consider an array of in counters, and use $y_k(t)$ and $c_j(t)$ to explicitly denote the number of counters with value k and the value of the j-th counter right before the t-th packet arrival, respectively. As shown in FIG. 10, $B_1$, the t-th packet, sees a counter value of two. Gray squares represent packets that have arrived before $B_1$, squares with characters represent forthcoming packets, and different patterns or characters represent different flows. For clarity we have omitted the uniform hash function that maps flows to counters.

First we note that, the counter value that any packet sees is independent of the arriving order of its preceding packets. We denote the set of flows by $\mathcal{F}$, and denote the x-th packet of flow f by $f_x$. We also denote the t-th packet among all packets by $e_t$ which sees value $v_t$, so the event "$\exists f \in \mathcal{F}, e_t = f_x$" (abbreviated to "$e_t = f_x$") means "the t-th packet is the x-th packet of some flow f, and $v_t = c_{hm(f)}(t)$. Now we have some theorems about the probability of this event.

Theorem 1.

The conditional probability that the t-th packet $e_t$ sees a counter value of z, given that $e_t$ is the x-th packet of some flow, is:

$$Pr(v_t = z \mid e_t = f_x) = \begin{cases} 0, & \text{if } z < x-1; \\ y/m, & \text{if } z \geq x-1 \text{ and } x = 1; \\ p, & \text{if } z \geq x-1 \text{ and } x > 1; \end{cases}$$

where $y = y_{z-x+1}(t)$ is the number of counters with value $z-x+1$ right before this packet arrives, $(y-1)/m \leq p \leq (y+1)/m$ and with high probability, $p = y/m$. Particularly, for $x=1$, that is for the first packet of each flow, we have $Pr(v_t = z \mid e_t = f_1) = y_z(t)/m$.

Proof of Theorem 1:

(1) Since the preceding x−1 packets belonging to the same flow as $e_t$ map into the same position, z is at least x−1, so the probability is always zero when $z < x-1$.

(2) For x=1, which means $e_t$ is the first packet of some flow, since the position mapping is uniform and is independent of any proceeding packets, the probability that it sees value z is just the percentage of counters with value z at that time, that is, $y_z(t) = m$.

Figure 11:
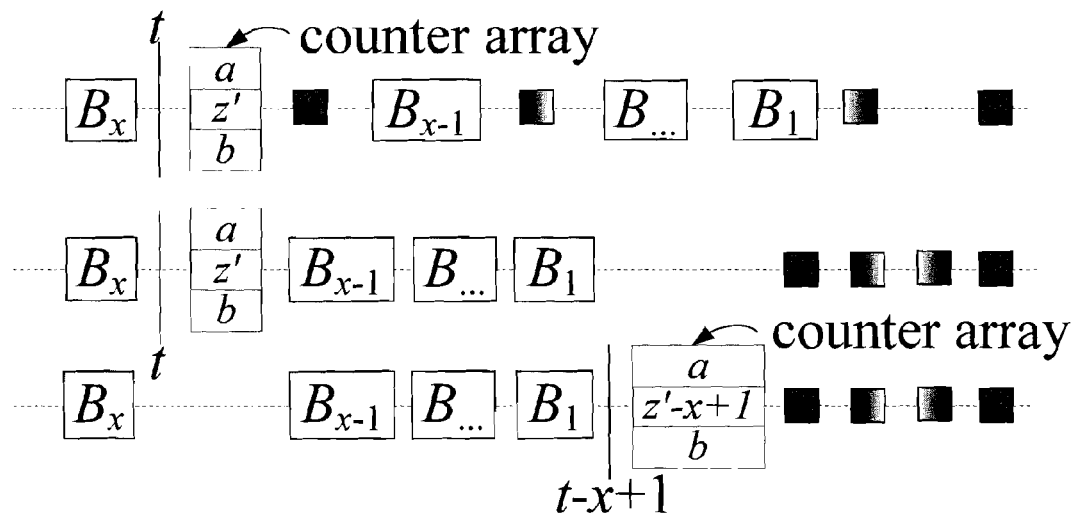
FIG. 11 illustrates a mapping of the counters in the filter according to one embodiment of the application.

(3) For x>1, however, the mapping of $B_x$ is dependent on $B_1$ and the probability is not simply $y_z(t)/m$. Let us focus on the counter which $B_1, B_2, \ldots$ are mapped to, as shown in FIG. 11. Due to collisions, there may be some other flows (gray squares) mapped to that counter.

In the first row, the t-th packet $B_x$ is the x-th packet of flow B, and it sees a counter value of z′. We can always reorder its preceding packets without changing the counter values. So we can look for a particular ordering to help the calculation of the probability of z′=z. Specifically, we put all the preceding x−1 packets of the same flow right before this packet, as shown in the second row of FIG. 11. Then $B_1$, the first packet of flow B, would have seen a counter value of z′−x+1, as shown in the third row. For this particular reordering, we have $Pr(v_t = z \mid e_t = f_x) = Pr(c_{h(f)}(t-x+1) = z-x+1 \mid e_t = f_x)$, that is, the probability that $B_x$ sees value z equals the probability that $B_1$ sees value z−x+1. It should be noted that all the other counters remain unchanged after this reordering. So if in the first and second row there are $y = y_{z-x+1}(t)$ counters having value z−x+1 right before $B_x$ (the t-th packet) arrives, then in the third row there must be at lease y−1 and at most y+1 counters having a value of z−x+1 right before $B_1$ arrives, since no other counter except the one $B_1$ (or $B_x$) is mapped to may change its value. That is to say, $(y-1)/m \leq Pr(c_j(t-x+1) = z-x+1 \mid e_t = f_x) \leq (y+1)/m$, and hence $(y-1)/m \leq p \leq (y+1)/m$. And with high probability, $p = y/m$. ∎

Then we can rewrite the probability that the t-th packet is the q-th packet of some flow:

Theorem 2.

$Pr(e_t = f_q)$ can be decomposed as $Pr(e_t = f_q) \approx \sum_{i=0}^{q-1} Pr(v_t = i) \times Y_{i,q}(t)$, where $Y_{i,q}(t)$ is a fixed polynomial expression of $m/y_0(t)$, $y_1(t)/y_0(t)$, $y_2(t)/y_0(t)$, ..., $y_{q-i-1}(t)/y_0(t)$.

Proof of Theorem 2:

We prove by induction.

(1) For q=1, since $Pr(v_t = 0, e_t = f_1) = Pr(v_t = 0)$, we have $$Pr(e_t = f_1) = \frac{Pr(v_t = 0, e_t = f_1)}{Pr(v_t = 0 \mid e_t = f_1)} = Pr(v_t = 0) \times \frac{m}{y_0(t)},$$

so the theorem holds for q=1.

(2) For q>1, we have, $$Pr(e_t = f_q) = \frac{Pr(v_t = q-1, e_t = f_q)}{Pr(v_t = q-1 \mid e_t = f_q)}$$

$$\approx \frac{Pr(v_t = q-1) - \sum_{x=1}^{q-1} Pr(v_t = q-1, e_t = f_x)}{y_0(t)/m}$$

$$= \frac{Pr(v_t = q-1) - \sum_{x=1}^{q-1} Pr(v_t = q-1 \mid c_t = f_x) \times Pr(c_t = f_x)}{y_0(t)/m}$$

$$\approx Pr(v_t = q-1) \times \frac{m}{y_0(t)} - \sum_{x=1}^{q-1} Pr\left(c_t = \int_x\right) \times \frac{y_{q-x}(t)}{y_0(t)},$$

where we approximate $Pr(v_t = z \mid e_t = f_x)$ by $y_{z-x+1}(t)/m$. By induction, our theorem holds for any q. ∎

By applying an expectation to theorem 2, we have

Corollary 1.

$E(I(e_t = f_q)) \approx \sum_{i=0}^{q-1} E(I(v_t = i) \times Y_{i,q}(t)$.

The exact expressions of $Y_{i,q}(t)$'s are fixed and can be pre-computed. Particularly, for q=1 and 2, we have $$E(I(e_t = f_1)) = E(I(v_t = 0)) \times m/y_0(t),$$

$$e(I(e_t = f_2)) \approx \frac{E(I(v_t = 1))}{y_0(t)/m} - \frac{E(I(v_t = 0))}{y_0(t)/m} \times \frac{y_1(t)}{y_0(t)}.$$

Now let us use this information to count specific flows. The number of flows with only one packet is:

$$n_1 = E(n_1)$$

$$= E\left(\sum_t I(e_t = f_1) - \sum_t I(e_t = f_2)\right)$$

-continued $$= \sum_t E(I(e_t = f_1)) - \sum_t E(I(e_t = f_2))$$

$$\approx \sum_t \left( \left( \frac{y_1(t)}{y_0(t)} + 1 \right) \times \frac{E(I(v_t = 0))}{y_0(t)/m} \right) -$$

$$\sum_t \frac{E(I(v_t = 1))}{y_0(t)/m}$$

$$= E\left[ \sum_{t:v_t=0} \left( \left( \frac{y_1(t)}{y_0(t)} + 1 \right) \times \frac{m}{y_0(t)} \right) - \sum_{t:v_t=1} \frac{m}{y_0(t)} \right],$$

Now we have decomposed $n_1$ into the expression of $y_0(t)$, $y_1(t)$ and $v(t)$, which are all observable: the number of counters with value zero and one, and the value that packet $e_t$ sees. Due to the unbiasedness of expectation, we have Conclusion 1.

If the t-th packet sees a counter value of zero, add $$\left( \frac{y_1(t)}{y_0(t)} + 1 \right) \times \frac{m}{y_0(t)}$$

to the singleton flow count. If it sees a counter value of one, deduct $$\frac{m}{y_0(t)}$$

form the singleton flow count. This procedure gives us an asymptotically unbiased estimator for singleton flow count, $$\hat{n}_1 = \sum_{t:v_t=0} \left( \left( \frac{y_1(t)}{y_0(t)} + 1 \right) \times \frac{m}{y_0(t)} \right) - \sum_{t:v_t=1} \frac{m}{y_0(t)}.$$

And this is exactly the formulas we used in equation 2).

Now for flows with at most q packets, we have $$\sum_{k=1}^{q} n_k = E\left( \sum_{k=1}^{q} n_k \right)$$

$$= E\left( \sum_t I(e_t = f_1) - \sum_t I(e_t = f_{q+1}) \right)$$

$$= \sum_t E(I(e_t = f_1)) - \sum_t E(I(e_t = f_{q+1})).$$

Using corollary 1, we further get $$\sum_{k=1}^{q} n_k = \sum_t \sum_{i=0}^{q} (E(I(v_t = i)) \times U_{i,q}(t))$$

$$= E\left( \sum_{i=0}^{q} \sum_{t:v_t=i} U_{i,q}(t) \right),$$

where $U_{i,q}(t)$ is also a fixed polynomial expression of $m/y_0(t)$, $y_1(t)/y_0(t)$, $y_2(t)/y_0(t)$, ..., $y_{q-i-1}(t)/y_0(t)$. Again, we can draw a conclusion on counting small flows:

Conclusion 2.

Asymptotically, $n_{1\sim q}$, the number of small flows that having no more than q packets, can be unbiasedly estimated by summing up $U_{i,q}(t)$'s for those packets that see a counter value of $i(i \leq q)$. That is, $\hat{n}_{1\sim q} = \Sigma_{i=0}^{q} \Sigma_{t:v_t=i} U_{i,q}(t)$. And this is the formular we used in equation 3).

We note here that, the variance is also a polynomial of $m/y_0(t)$ and $y_i(t)/y_0(t)$'s. Particularly, when counting singleton flows, the variance is $$\sum_{t:e_t=f_1} \left[ \left( \left( \frac{y_1(t)}{y_0(t)} + 1 \right)^2 + \frac{y_1(t)}{y_0(t)} \right) \times \frac{m}{y_0(t)} - 1 \right] + \sum_{t:e_t=f_2} \left( \frac{m}{y_0(t)} - 1 \right).$$

So if at least half of the counters are empty, that is $y_0(t) \geq m/2 \geq y_i(t)$, $\forall i \geq 1$, we can derive a loose (but already good enough) bound on the variance. Only $\lceil \log(q+2) \rceil$ bits are needed for each counter, since we only need to record up to $q+1$.

The formulas of $Y_{i,q}(t)$ and $U_{i,q}(t)$ can be deducted from Theorem 2, and are:

$$Y_{q-1,q} = \frac{m}{y_0}, \quad \quad 8)$$

$$Y_{q-2,q} = -1 \times \left[ Y_{q-1,q} \times \frac{y_1}{y_0} \right],$$

$$Y_{q-3,q} = -1 \times \left[ Y_{q-2,q} \times \frac{y_1}{y_0} + Y_{q-1,q} \times \frac{y_2}{y_0} \right],$$

...

$$Y_{q-i,q} = -1 \times \left[ \sum_{j=1}^{i-1} Y_{q-(i-j),q} \times \frac{y_j}{y_0} \right],$$

...

$$Y_{0,q} = -1 \times \left[ \sum_{j=1}^{q-1} Y_{j,q} \times \frac{y_j}{y_0} \right].$$

$$U_{0,q} = m/y_0 - Y_{0,q+1},$$

$$U_{i,q} = -Y_{i,q+1}, \quad 1 \leq i \leq q.$$

These will be used in equation 3) in the detecting unit 203.

2. Mathematical Support for Equation 7)

We first analyze a column of counters in the counting units 301. For this mathematical analysis, we still use m to denote the number of counters, while in the specification of the system modules, we use w to denote this number. After this, we will analyze combining three columns of counters.

2.1 A Single Column of Counters

After updating the column of counters with all packets, we use $c_1, \ldots, c_m$ to denote the counter values (while in the specification of the system modules, we use $M_x[i]$ to denote the counter values). We use $y_k$ to denote the number of counters with value k. In addition, we use n to represent the total flow count, and use $n_k$ to represent the number of flows with exactly k packets.

Now consider a counter c[l] whose value is zero, which means no flow maps into position l. This probability is expected to be $$\left( 1 - \frac{1}{m} \right)^n \approx e^{-\frac{n}{m}}.$$

While the probability of a counter has a value of one is $$\binom{n_1}{1}\frac{1}{m}\left(1-\frac{1}{m}\right)^{n_1-1}\left(1-\frac{1}{m}\right)^{\sum_{i\geq 2}n_i} \approx \frac{n_1}{m}e^{-n/m}.$$

Formally, we have

Lemma 1.

When n and m simultaneously approach infinity ($\lim_{m\to\infty} n^2/m$), we have $\lim_{m\to\infty} E(y_0) = me^{-\alpha}$, $\lim_{m\to\infty} E(y_1) = n_1 e^{-\alpha}$.

where $\alpha = \lim_{m\to\infty} n/m$. Furthermore, $y_0$ and $y_1$ are the MLEs (Maximum Likelihood Estimator) of $E(y_0)$ and $E(y_1)$ respectively.

Proof of Lemma 1:

We consider the limit distributions of $y_0$ and $y_1$ in two propositions.

Proposition 1.

When n, $n_1$ and m simultaneously tend to infinity, the limit distributions of $y_0$ and $y_1$ both converge to Poisson, with expectations converging to $$\lambda_0 = me^{-\frac{n}{m}}$$

and $$\lambda_1 = n_1 e^{-\frac{n}{m}}$$

respectively, if $\lambda_0$ and $\lambda_1$ remain bounded, as proved as follows:

It has been proved in the literature that, with n balls, m urns, let $p_{n,m}(t)$ be the probability that exactly t urns are empty, then $p_{n,m}(t)$ converges to Poisson distribution with parameter $$\lambda = me^{-\frac{n}{m}},$$

if n and m tend to infinity so that $$\lambda = me^{-\frac{n}{m}}$$

remains bounded. If we have n flows and m counters, the empty counters after seeing all packets will be exactly the same as the empty urns in the urn model, so $y_0$ also converges to Poisson distribution.

We give a proof sketch for the case of $y_1$. Let $q_{n,m}(t)$ be the probability that there are t counters with value 1 after seeing all packets, then the corresponding packets can only be from the $n_1$ singleton flows, and $$q_{n,m}(t) = \frac{t!\binom{n_1}{t}\binom{m}{t}(m-t)^{n-t} \times q_{n-t,m-t}(0)}{m^n}.$$

Take for abbreviation $$R_{n,m}(v) = \frac{v!\binom{n_1}{v}\binom{m}{v} \times (m-v)^{n-v}}{m^n},$$

and using the rule of inclusion and exclusion, we can get $$q_{n,m}(0) = \sum_{v=0}^{m}(-1)^v R_{n,m}(v).$$

Since $$(m-v)^v\left(1-\frac{v}{m}\right)^n < v!\binom{m}{v}\left(1-\frac{v}{m}\right)^n < m^v\left(1-\frac{v}{m}\right)^n,$$

and $$\left(\frac{n_1-v}{m-v}\right)^v < \frac{v!\binom{n_1}{v}}{(m-v)^v} < \left(\frac{n_1}{m-v}\right)^v,$$

multiply these two inequalities, we can get $$\left(\frac{n_1-v}{m-v}\right)^v m^v\left(1-\frac{v}{m}\right)^{n+v} < v!R_{n,m}(v) < \left(\frac{n_1}{m-v}\right)^v m^v\left(1-\frac{v}{m}\right)^n.$$

And since $$t < -\log(1-t) < \frac{t}{1-t},$$

we have $$e^{-\frac{t}{1-t}} < 1-t < e^{-t},$$

so $$\left(m\frac{n_1-v}{m-v}e^{-\frac{n+v}{m-v}}\right)^v = \left(\frac{n_1-v}{m-v}\right)^v m^v\left(e^{-\frac{v/m}{1-v/m}}\right)^{n+v} <$$
$$v!R_{n,m}(v) < \left(\frac{n_1}{m-v}\right)^v m^v\left(e^{-\frac{v}{m}}\right)^n = \left(m\frac{n_1}{m-v}e^{-\frac{n}{m}}\right)^v.$$

For each fixed v, the extreme ratio of the left side and the right side tends to 1, so we have $$0 < \frac{\lambda^v}{v!} - R_{n,m}(v) \to 0,$$

if n and m increase and $$\lambda = n_1 e^{-\frac{n}{m}}$$

is constrained to a finite interval $0<a<\lambda<b$. If $\lambda$ tends to 0, $$0 \leq \frac{\lambda^v}{v!} - R_{n,m}(v) \to 0$$

also holds. So we can get $$R_{n,m}(v) \sim \frac{\lambda^v}{v!}.$$

Now $$e^{-\lambda} - q_{n,m}(0) = \sum_{v=0}^{\infty} (-1)^v \left\{ \frac{\lambda^v}{v!} - R_{n,m}(v) \right\}$$

tends to 0, so we have $q_{n,m}(0) \sim e^{-\lambda}$, which also implies $q_{n-t,m-t}(0) \sim e^{-\lambda}$, and $$q_{n,m}(t) = R_{n,m}(t) \times q_{n-t,m-t}(0) \sim \frac{\lambda^t}{t!} e^{-\lambda}.$$

Proposition 2.

When n, $n_1$ and m simultaneously tend to infinity, if $$me^{-\frac{n}{m}} \text{ and } n_1 e^{-\frac{n}{m}}$$

do not remain bounded, but $$\alpha = \lim_{m \to \infty} \frac{n}{m} \text{ and } \alpha_1 = \lim_{m \to \infty} \frac{n_1}{m}$$

are bounded, the limit distributions of $y_0$ and $y_1$ converge to normal distribution, with $$\lim_{m \to \infty} E(y_0) = me^{-\alpha}, \lim_{m \to \infty} \text{var}(y_0) = me^{-\alpha}(1 - e^{-\alpha}(1 + \alpha)),$$

and $$\lim_{m \to \infty} E(y_1) = n_1 e^{-\alpha},$$

$$\lim_{m \to \infty} \text{var}(y_1) = n_1 e^{-\alpha}\left(1 - \alpha_1 e^{-\alpha}\left(-1 + \frac{1}{\alpha_1} + \alpha\right)\right).$$

The case for $y_0$ is again the same as that in the urn model, and the case for $y_1$ can be proved based on the following probability theory which was proved in "H. Geiringer. On the probability theory of arbitrarily linked events. Annals of Mathematical Statistics, 9(4):260-271, 1938."

Theorem 3.

Let $p_1, p_2, \ldots, p_m$ be the probability of m events $E_1, E_2, \ldots, E_m$, $p_{ij}$ be the probability of the simultaneous occurrence of $E_i$ and $E_j$, $p_{ijk}$ that of $E_i, E_j, E_k$ and finally $p_{12\ldots m}$ that of $E_1, E_2, \ldots, E_m$. We want to determine the probability $P_m(x)$ that x of the m events will take place. We consider the convergence of $$V_m(x) = \sum_{t \leq x} P_m(t),$$

which is the CDF of x. Denoting the mean value of x for $V_m(x)$ by $a_m = \sum_{x=1}^{m} x P_m(x)$, and denoting the variance of x for $V_m(x)$ by $s_m^2$, let $$S_m(0) = 1, S_m(1) = \sum_{i}^{1\ldots n} p_i, S_n(2) = \sum_{i,j}^{1\ldots n} p_{ij},$$

$$S_n(3) = \sum_{i,j,k}^{1\ldots n} p_{ijk}, \ldots S_m(m) = p_{12\ldots m}.$$

If we introduce the following function of the discontinuous variable $z=0, 1, 2, \ldots, m$ $$g_m(z) = \frac{z+1}{a_m} \frac{S_m(z+1)}{S_m(z)},$$

and put $z = a_m u$ where u is regarded as a continuous variable in the interval from 0 to $\epsilon (\epsilon > 0)$. If $h_m(u) = g_m(z)$ satisfies the following conditions:

1) If m is sufficiently large, $h_m(u)$ admits derivatives of every order in the interval $(0, \epsilon)$.

2) At $u=0$, the first derivative of $h_m(u)$ has a limit, for $m \to \infty$, which is different from $-1$.

3) If u is in the interval $(0, \epsilon)$, the k-th derivatives of $h_m(u)$ remains, for every k, inferior to a bound $N_k$ which is independent of m.

Then the asymptotic behavior of $P_n(x)$ converges towards a normal distribution, that is $$\lim_{n \to \infty} V_m(a_m + y s_m \sqrt{2}) = \frac{1}{\sqrt{\pi}} \int_{-\infty}^{y} e^{-x^2} dx,$$

and $\lim_{m \to \infty} \frac{s_m^2}{a_m} = 1 + h'_m(0).$

Now following theorem 3, we have $$S_m(z) = \frac{\binom{m}{z}\binom{n_1}{z} z! \times (m-z)^{n-z}}{m^n},$$

and $$g_m(z) = \frac{z+1}{a_m} \times \frac{\binom{m}{z+1}\binom{n_1}{z+1}(z+1)!}{\binom{m}{z}\binom{n_1}{z} z!} \times \frac{(m-(z+1))^{n-(z+1)}}{(m-z)^{n-z}}$$

-continued $$= \frac{z+1}{mn_1\left(\frac{1}{m}\right)^1\left(1-\frac{1}{m}\right)^{n-1}} \times \frac{\binom{m}{z+1}\binom{n_1}{z+1}(z+1)!}{\binom{m}{z}\binom{n_1}{z}z!} \times$$

$$\frac{(m-(z+1))^{n-(z+1)}}{(m-z)^{n-z}}$$

$$= \frac{m-z}{m} \times \frac{n_1-z}{n_1} \times \frac{m^n}{(m-1)^{n-1}} \times \frac{(m-(z+1))^{n-(z+1)}}{(m-z)^{n-z}}$$

$$= \frac{m-z}{m} \times \frac{n_1-z}{n_1} \times$$

$$\left[\left(\frac{1-\frac{z+1}{m}}{\left(1-\frac{z}{m}\right)\left(1-\frac{1}{m}\right)}\right)^{ma} \times \frac{\left(1-\frac{1}{m}\right)\left(1-\frac{z}{m}\right)^z}{\left(1-\frac{z+1}{m}\right)^{z+1}}\right].$$

Plug $$\alpha_1 = \frac{n_1}{m}$$

into it, also introduce a new variable $$v = \frac{z}{m} = u\frac{a_m}{m},$$

since $a_m$ is of the order of magnitude of m, we get $$\bar{h}_m(v) = g_m(z) =$$

$$(1-v)\frac{\alpha_1-v}{\alpha_1} \times \left[\left(\frac{1-\frac{1}{m(1-v)}}{1-\frac{1}{m}}\right)^{ma} \times \frac{1-\frac{1}{m}}{1-v-\frac{1}{m}} \times \left(1-\frac{1}{m(1-v)}\right)^{-mv}\right].$$

We can easily see that the condition 1) and 3) in theorem 3 are satisfied (if $\epsilon<1$) since the k-th derivatives of $\bar{h}_m(v)$ contains only rational expressions of $(1-v)$ and positive powers of $$\log\left(1-\frac{1}{m(1-v)}\right),$$

and $$\lim_{m\to\infty}\left(\frac{d\bar{h}_m(v)}{dv}\right)_{v=0} = \lim_{m\to\infty}\left\{-1-\frac{1}{\alpha_1} + \left[\frac{-\frac{\alpha}{1-\frac{1}{m}} + \frac{1}{1-\frac{1}{m}}}{m\log\left(1-\frac{1}{m}\right)}\right]\right\}$$

$$= 1 - \frac{1}{\alpha_1} - \alpha,$$

so $$\lim_{m\to\infty}\left(\frac{dh_m(u)}{du}\right)_{v=0} = \lim_{m\to\infty}\left(\frac{d\bar{h}_m(v)}{dv}\right)_{v=0} \times \lim_{m\to\infty}\frac{a_m}{m}$$

$$= \alpha_1 e^{-\alpha}\left(1 - \frac{1}{\alpha_1} - \alpha\right).$$

Let $$g(\alpha_1) = \alpha_1 e^{-\alpha}\left(1 - \frac{1}{\alpha_1} - \alpha\right),$$

we must prove $g(a_1)>-1$ as stated in condition 2) of theorem 3.

Let $f(\alpha)=\alpha e^{-\alpha}(1-1/\alpha-\alpha)=e^{-\alpha}(-\alpha^2+\alpha-1)$, then its derivative $f'(\alpha)=e^{-\alpha}(\alpha-1)(\alpha-2)$, so the local min/max values are obtained at $\alpha=0$, 1, 2, since $\alpha>0$, and $f'(1)=f'(2)=0$. Since $f''(\alpha)=-e^{-\alpha}(\alpha^2-5\alpha+5)$, $f''(1)<0$ and $f''(2)>0$, the minimum values may be obtained at $\alpha=0$ or 2. Since $f(0)=-1$ and $f(2)=-3e^{-2}$, and $\alpha>0$, we get $f(\alpha)>-1$.

Now $g(\alpha_1)-f(\alpha)=e^{-\alpha}(\alpha-\alpha_1)(\alpha-1)$, since $\alpha_1\leq\alpha$, if $\alpha\geq1$, we can get $g(\alpha_1)\geq f(\alpha)>-1$. If $\alpha<1$, that is $0<\alpha_1\leq\alpha_1$. Now $g(\alpha_1)=e^{-\alpha}(1-\alpha)\alpha_1-e^{-\alpha}>e^{-\alpha}>-1$.

So, we finally get $$\lim_{m\to\infty} h'_m(0) = g(\alpha_1) > -1,$$

then we can conclude that, $y_1$ converges to normal distribution with $$\lim_{m\to\infty}\frac{s_m^2}{a_m} = 1 - \alpha_1 e^{-\alpha}\left(-1 + \frac{1}{\alpha_1} + \alpha\right).$$

With simple manipulation, we get the results stated in proposition 2.

With Proposition 1 and 2, we have proved Lemma 1, since the sample mean is the MLE of the expectation of a Poisson or Normal distribution.■

Lemma 2.

The number of singleton flows, $n_1$, can be estimated asymptotically unbiased by an MLE $\hat{n}_1=m\times y_1/y_0$. The variance is approximately $n_1((e^\alpha-2\alpha)\alpha_1+e^\alpha-1)$, where $\alpha_1=\lim_{m\to\infty}n_1/m$.

Proof for Lemma 2:

We prove four propositions step by step.

Proposition 1.

The two variables $y_0$ and $y_1$ are asymptotically independent.

Let us consider such a reordering of the packet arrivals that all flows of size more than one arrive before any singleton flow. Since such a reorder will not change the distribution of counter values, we will get the same probabilities. Assume right before any singleton flow arrives, exactly k counters remain empty. Now only those singleton flows which map into these k counters are able to induce counter value of zero or one, since the other m-k counters have value at least two. Assume $n_1'$ singleton flows map into these k counters, then this is just a classical occupancy problem, where exactly $y_0$ counters have value zero and $y_1$ counters have value one. The coefficient of $y_0$ and $y_1$ in such a classical occupancy problem can almost be neglected when $n_1/m$ is not around 1 (following "Random Allocations", equation (9), pp. 38), and since under most conditions, $y_1$ and $y_0$ are normal and their joint distribution is multivariate normal, they are asymptotically conditional independent for any given k, thus $y_1$ and $y_0$ are asymptotically independent.

Proposition 2.

Asymptotically, $\hat{n}_1$ is a Maximum Likelihood Estimator (MLE) of $n_1$ From Lemma 1, we know $$\lim_{m\to\infty} \frac{E(y_1)}{E(y_0)} = \frac{n_1}{m},$$

that is $$n_1 = m \times \lim_{m\to\infty} \frac{E(y_1)}{E(y_0)}.$$

Since if $\hat{X}_1, \hat{X}_2, \ldots, \hat{X}_t$ are the MLEs of variables $X_1, X_2, \ldots, X_t$ respectively, and if function $\tau(X_1, X_2, \ldots, X_t)$ is a transform of the parameter space of $(X_1, X_2, \ldots, X_t)$, then $\tau(\hat{X}_1, \hat{X}_2, \ldots, \hat{X}_t)$ is the MLE of $\tau(X_1, X_2, \ldots, X_t)$, and by Lemma 1, $y_0$ and $y_1$ are the MLEs of $E(y_0)$ and $E(y_1)$ respectively, we get that $\hat{n}_1$ is the MLE of $n_1$.

Proposition 3.

The estimator $\hat{n}_1$ asymptotically unbiased.

Expanding f(X) by Taylor series, provided that f is thrice differentiable and that the mean and variance of X are finite, it will have $$E[f(X)] = E\begin{bmatrix} f(E(X)) + [X - E(X)]f'(E(X)) + \\ \frac{[X - E(X)]^2}{2}f''(E(X)) + \ldots \end{bmatrix}$$

$$\approx E[f(E(X))] + E[[X - E(X)]f'(E(X))] +$$

$$E\left[\frac{[X - E(X)]^2}{2}f''(E(X))\right]$$

$$= f(E(X)) + \frac{\text{var}(X)}{2}f''(E(X)).$$

So for $$f(y_0) = \frac{1}{y_0},$$

we have $$E\left(\frac{1}{y_0}\right) \approx \frac{1}{E(y_0)} + \frac{\text{var}(y_0)}{E^3(y_0)}.$$

Since $y_0$ and $y_1$ are two independent random variables, we have $$E(\hat{n}_1) = m \times E(y_1) \times E\left(\frac{1}{y_0}\right)$$

$$\approx m \times E(y_1) \times \left(\frac{1}{E(y_0)} + \frac{\text{var}(y_0)}{E^3(y_0)}\right)$$

-continued $$= m \times n_1 e^{-\alpha} \times \left(\frac{1}{me^{-\alpha}} + \frac{me^{-\alpha}(1 - e^{-\alpha}(1+\alpha))}{(me^{-\alpha})^3}\right)$$

$$= n_1\left(1 + \frac{(1 - e^{-\alpha}(1+\alpha))}{me^{-\alpha}}\right)$$

$$= n_1 + \frac{n_1(1 - e^{-\alpha}(1+\alpha))}{me^{-\alpha}}.$$

Since $$\lim_{m\to\infty} \text{bias}\left(\frac{\hat{n}_1}{n_1}\right) = \lim_{m\to\infty} \frac{e^\alpha - (1+\alpha)}{m} = 0,$$

$\hat{n}_1$ is asymptotically unbiased.

Proposition 4.

Asymptotically, $$\text{var}(\hat{n}_1) \approx (e^\alpha - 2\alpha)\frac{n_1^2}{m} + (e^\alpha - 1)n_1.$$

Similarly, using Taylor expansion, $$\text{var}[f(X)] = \text{var}[f(E(X)) + [X - E(X)]f'(E(X))) + \ldots] \approx$$

$$[f'(E(X))]^2\text{var}(X).$$

so $$\text{var}\left(\frac{1}{y_0}\right) \approx \left[-\frac{1}{E^2(y_0)}\right]^2 \text{var}(y_0) = \frac{\text{var}(y_0)}{E^4(y_0)}.$$

For independent random variables A and B, it will have $$\text{var}(AB) = \text{var}(A)E^2(B) + \text{var}(B)E^2(A) + \text{var}(A)\text{var}(B),$$

so we have $$\text{var}\left(\frac{y_1}{y_0}\right) = \text{var}(y_1)E^2\left(\frac{1}{y_0}\right) + \text{var}\left(\frac{1}{y_0}\right)E^2(y_1) + \text{var}(y_1)\text{var}\left(\frac{1}{y_0}\right)$$

$$\approx \text{var}(y_1)\left[\frac{1}{E(y_0)} + \frac{\text{var}(y_0)}{E^3(y_0)}\right]^2 +$$

$$\frac{\text{var}(y_0)}{E^4(y_0)}E^2(y_1) + \text{var}(y_1)\frac{\text{var}(y_0)}{E^4(y_0)}$$

$$= \frac{\text{var}(y_1)}{E^2(y_0)}\left[1 + 3\frac{\text{var}(y_0)}{E^2(y_0)} + \left(\frac{\text{var}(y_0)}{E^2(y_0)}\right)^2\right] +$$

$$\frac{\text{var}(y_0)}{E^2(y_0)}\frac{E^2(y_1)}{E^2(y_0)}.$$

Denoting by $$M = \frac{\text{var}(y_0)}{E^2(y_0)} = \frac{e^\alpha - 1 - \alpha}{m} \sim O\left(\frac{1}{m}\right),$$

we have $$\text{var}\left(\frac{y_1}{y_0}\right) \approx \frac{\text{var}(y_1)}{\text{var}(y_0)}M(1 + 3M + M^2) + \frac{E^2(y_1)}{E^2(y_0)}M$$

-continued $$\approx \left[\frac{\text{var}(y_1)}{\text{var}(y_0)} + \frac{E^2(y_1)}{E^2(y_0)}\right] \times M,$$

$$\text{var}(\hat{n}_1) = m^2 \times \text{var}\left(\frac{y_1}{y_0}\right)$$

$$\approx m^2 \times \left[\frac{\text{var}(y_1)}{\text{var}(y_0)} + \frac{E^2(y_1)}{E^2(y_0)}\right] \times \frac{e^\alpha - 1 - \alpha}{m}$$

$$= m(e^\alpha - 1 - \alpha) \times \left[\alpha_1\left(1 + \frac{\alpha_1 - \alpha_1\alpha + \alpha}{e^\alpha - 1 - \alpha}\right) + \alpha_1^2\right]$$

$$= m \times [(e^\alpha - 2\alpha)\alpha_1^2 + (e^\alpha - 1)\alpha_1]$$

$$= (e^\alpha - 2\alpha)\frac{n_1^2}{m} + (e^\alpha - 1)n_1.$$

So, if $n_1$ is very small, the variance is also small, and if $n_1$ is large, the relative standard error is $$\text{stderr}(\hat{n}_1) = \sqrt{\text{var}\left(\frac{\hat{n}_1}{n_1}\right)} \approx \sqrt{\frac{e^\alpha - 2\alpha}{m} + \frac{e^\alpha - 1}{n_1}},$$

and this ensures that it is a good estimator for super scanners with a large $n_1$ if we keep m large enough, and we use it as a cardinality sketch in our estimating module. ∎

Lemma 3.

For estimating the number of small flows, we can use the following iterative equation to estimate $n_1, n_2, \ldots, n_q$ step by step:

$$\hat{n}_q = m \times \left(\frac{y_q}{y_0} - \sum_{i=1}^{|B_q|-1}\left(\prod_{d=1}^{q-1} \frac{(\hat{n}_d/m)^{\beta_{i(d)}}}{\beta_{i(d)}!}\right)\right) \qquad 9)$$

Proof for Lemma 3:

Use $B_q$ to denote the set of different flow set patterns that have exactly q packets, and use $\beta_i$ ($1 \leq i \leq B_q$) to denote a specific flow set pattern in $B_q$, so there are totally q packets in $\beta_i$, and a counter with a value of q will correspond to some $\beta_i$. Suppose $\beta_i$ is composed of $\beta_{i(1)}$ flows of size one, $\beta_{i(2)}$ flows of size two, ..., $\beta_{i(q)}$ flows of size q, and no flow of size more than q, we can write $$\beta_i = <\beta_{i(1)}, \beta_{i(2)}, \ldots, \beta_{i(q)}, 0, \ldots>$$

and order them: $\beta_1 = <q, 0, \ldots, 0, 0, \ldots>$ corresponding to q flows of size one, $\beta_2 = <q-2, 1, 0, \ldots, 0, 0, \ldots>$ corresponding to q−2 flows of size one and one flow of size two, and $\beta_{|B_q|} = <0, 0, \ldots, 1, 0, \ldots>$ (the q-th element is 1) corresponding to one flow of size q. Denoting the number of counters with value x by $y_x$, and the number of flows of size x by $n_x$, when m is large, we have $$E\left(\frac{y_q}{m}\right) = \sum_{i=1}^{|B_q|} \Pr(\beta_i),$$

where $\Pr(\beta_i)$, the probability that the flow pattern $\beta_i$ appears, is $$\prod_{d=1}^{q} C_{n_d}^{\beta_{i(d)}} \left(\frac{1}{m}\right)^{\beta_{i(d)}} \left(1 - \frac{1}{m}\right)^{n_d - \beta_{i(d)}} \prod_{d>q}\left(1 - \frac{1}{m}\right)^{n_d}.$$

Then by simple manipulation, we get $$\frac{E(y_q)}{m} \approx \frac{E(y_0)}{m}\left[\sum_{i=1}^{|B_q|-1}\left(\prod_{d=1}^{q-1} \frac{(n_d/m)^{\beta_{i(d)}}}{\beta_{i(d)}!}\right) + \frac{n_q}{m}\right],$$

so $$n_q \approx m \times \left(\frac{E(y_q)}{E(y_0)} - \sum_{i=1}^{|B_q|-1}\left(\prod_{d=1}^{q-1} \frac{(n_d/m)^{\beta_{i(d)}}}{\beta_{i(d)}!}\right)\right).$$

where $B_q$ can be pre-computed. ∎

2.2 Combining Three Columns of Counters

When considering the estimating unit 305, we use three columns of counters. Each column, by the above mathematical analysis, can be used to estimate the total small flow count of all hosts that are mapped to that column. Now we deal with how to combine them to estimate the small flow count of the host that is mapped to exactly the three columns.

Let us denote the three sketches by $M_1$, $M_2$ and $M_3$, and denote the corresponding flows mapped to them by $S_1$, $S_2$ and $S_3$. We denote by $|M_i|^k$ the number of flows with k packets estimated from $M_i$, which is an estimate on $|S_i|^k$, the exact number of flows with k packets in $S_i$, and we abuse k=0 for total flows. So we can compute an estimation for $|S_i|^k$ as $\widehat{|S_i|^k} = |M_i|^k$ using equation 9) above. The idea of combining three columns is that, although more than one host can be mapped to each column, there is only a very small probability that more than one host can be simultaneously mapped to the same three columns. So we can just use $|S_1 \cap S_2 \cap S_3|^k$ as the number of flows with k packets of the host mapped to the three columns.

Figure 12:
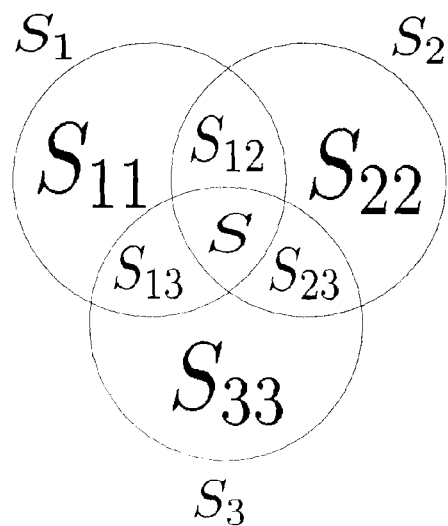
FIG. 12 illustrates a permutation of the counters in the estimator as shown in FIG. 5.

Now we discuss operations among three sets ($S_1$, $S_2$, $S_3$) and the corresponding columns ($M_1$, $M_2$, $M_3$). The ancillary notations are: $S_{ii} = S_i - S_j - S_k$, $S_{ij} = (S_i \cap S_j) - S_l$, and $S = S_i \cap S_j \cap S_l$, where i, j, l is a permutation of 1, 2, 3, as shown in FIG. 12. We also denote by $M_i + M_j$ ($M_i + M_j + M_l$) the counter-wise addition, such that $(M_i + M_j)[i] = M_i[i] + M_j[i]$ (($M_i + M_j + M_l)[i] = M_i[i] + M_j[i] + +M_l[i]$), for $1 \leq i \leq m$. We also call such a column of counters as a "sketch". Note that when two sketches are added up, some packets are counted twice, and when three sketches are added up, some packets are counted twice, and some packets are counted thrice.

Case 1: For k=0, we have $$|M_i|^0 = \widehat{|S_i|^0},$$

$$|M_i + M_j|^0 = |S_i \hat{\cup} S_j|^0,$$

$$|M_i + M_j + M_l|^k = |S_i \cup \hat{S}_j \cup S_l|^0,$$

so we get $$|\hat{S}|^0 = |\hat{S_1}|^0 + |\hat{S_2}|^0 + |\hat{S_3}|^0 - \\ |S_1 \cup S_2|^0 - |S_2 \cup S_3|^0 - |S_1 \cup S_3|^0 + \\ |S_1 \cup S_2 \cup S_3|^0 \\ = |\hat{M_1}|^0 + |\hat{M_2}|^0 + |M_3|^0 - \\ |M_1 + M_2|^0 - |M_2 + M_3|^0 - |M_1 + M_3|^0 + \\ |M_1 + M_2 + M_3|^0. \qquad 10)$$

Case 2: For flow size of k=6x+1 or k=6x+5, we have $$|M_i|^k = |\hat{S_{ii}}|^k + |\hat{S_{ij}}|^k + |\hat{S_{ik}}|^k + |\hat{S}|^k,$$

$$|M_i + M_j|^k = |\hat{S_{ii}}|^k + |\hat{S_{jj}}|^k + |\hat{S_{il}}|^k + |\hat{S_{jl}}|^k,$$

$$|M_i + M_j + M_l|^k = |\hat{S_{ii}}|^k + |\hat{S_{jj}}|^k + |\hat{S_u}|^k.$$

so we get $$|\hat{S}|^k = (|M_1|^k + |M_2|^k + |M_3|^k - |M_1 + M_2|^k - \\ |M_2 + M_3|^k - |M_1 + M_3|^k + |M_1 + M_2 + M_3|^k) \times \frac{1}{3}. \qquad 11)$$

Case 3: For flow size of k=6x+2 or k=6x+4, we have $$|M_i|^k = |\hat{S_{ii}}|^k + |\hat{S_{ij}}|^k + |\hat{S_{il}}|^k + |\hat{S}|^k,$$

$$|M_i + M_j|^k = |\hat{S_{ii}}|^k + |\hat{S_{jj}}|^k + |\hat{S_{il}}|^k + |\hat{S_{jl}}|^k + |\hat{S_{ij}}|^{k/2} + |\hat{S}|^{k/2},$$

$$|M_i + M_j + M_l|^k = |\hat{S_{ii}}|^k + |\hat{S_{jj}}|^k + |\hat{S_u}|^k + |\hat{S_{ij}}|^{k/2} + |\hat{S_{il}}|^{k/2} + |\hat{S_{jl}}|^{k/2},$$

so we have $$|\hat{S}|^k = \\ (|M_1|^k + |M_2|^k + |M_3|^k - |M_1 + M_2|^k - |M_2 + M_3|^k - |M_1 + M_3|^k + \\ |M_1 + M_2 + M_3|^k) \times \frac{1}{3} + |\hat{S}|^{k/2}, \qquad 12)$$

where $|S|^{k/2}$ can be induced from earlier computations.

Case 4: For flow size of k=6x+3, we have $$|M_i|^k = |\hat{S_{ii}}|^k + |\hat{S_{ij}}|^k + |\hat{S_{il}}|^k + |\hat{S}|^k,$$

$$|M_i + M_j|^k = |\hat{S_{ii}}|^k + |\hat{S_{jj}}|^k + |\hat{S_{il}}|^k + |\hat{S_{jl}}|^k,$$

$$|M_i + M_j + M_l|^k = |\hat{S_{ii}}|^k + |\hat{S_{jj}}|^k + |\hat{S_u}|^k + |\hat{S}|^{k/3},$$

so we get $$|\hat{S}|^k = \\ -(|M_1|^k + |M_2|^k + |M_3|^k - |M_1 + M_2|^k - |M_2 + M_3|^k - |M_1 + M_3|^k + \\ |M_1 + M_2 + M_3|^k) \times \frac{1}{3} + |\hat{S}|^{k/3} \times \frac{1}{3}, \qquad 13)$$

where $|S|^{k/3}$ can be induced from earlier computations.

Case 5: For flow size of k=6x (x>0), we have $$|\hat{S}|^k = \\ (|M_1|^k + |M_2|^k + |M_3|^k - |M_1 + M_2|^k - |M_2 + M_3|^k - |M_1 + M_3|^k + \\ |M_1 + M_2 + M_3|^k) \times \frac{1}{3} + |\hat{S}|^{k/2} - |\hat{S}|^{k/3} \times \frac{1}{3}, \qquad 14)$$

so we get $$|M_i|^k = |\hat{S_{ii}}|^k + |\hat{S_{ij}}|^k + |\hat{S_{il}}|^k + |\hat{S}|^k,$$

$$|M_i + M_j|^k = |\hat{S_{ii}}|^k + |\hat{S_{jj}}|^k + |\hat{S_{il}}|^k + |\hat{S_{jl}}|^k + |\hat{S_{ij}}|^{k/2} + |\hat{S}|^{k/2},$$

$$|M_i + M_j + M_l|^k = |\hat{S_{ii}}|^k + |\hat{S_{jj}}|^k + |\hat{S_u}|^k + |\hat{S}|^{k/3} + |\hat{S_{il}}|^{k/2} + |\hat{S_{jl}}|^{k/2} + |\hat{S_{ij}}|^{k/2},$$

where $|S|^{k/2}$ and $|S|^{k/3}$ can be induced from earlier computations.

Finally, when estimating the number of flows with no more than q packets, we need to add $\widehat{|S|^k}$'s together from k=1 to q, that is $$St = \Sum_{k=1}^q \widehat{|S|^k} \qquad 15)$$

A special case is when k=1, so using equation 11), we get $$St = (|M_1|^1 + |M_2|^1 + |M_3|^1 - |M_1 + M_2|^1 - |M_2 + M_3|^1 - |M_1 + M_3|^1 + |M_1 + M_2 + M_3|^1)/3.$$

Combining this with Lemma 2 for estimating singleton flows from a single column, we get equation 7) used in step 905.

The present invention has been illustrated by the above descriptions and embodiments, but the present invention is not limited thereto. Various modifications and changes can be made by those skilled in the art according to the disclosure herein, which should be within the scope of the present invention.

The invention claimed is:

1. A system for catching top hosts from a plurality of hosts, comprising:
    a filter configured to sample flows from the hosts and remove the flows that do not satisfy a constraint;
    a tracker configured to record a first estimated flow count for each host and to determine a first set of hosts from the plurality of hosts in terms of the estimated flow count; and
    an estimator configured to determine a second estimated flow count for each of the determined hosts and select a second set of hosts from the determined hosts based on the second estimated flow count,
    wherein determining the second estimated flow count further comprises:
        calculating a plurality of sums from a plurality of counters;
        determining whether any of the sums overflow;
        estimating the flow count based on the determined difference and a rate of sampling r if any of the sums are determined to overflow; and estimating the flow count based on counts in the plurality of counters, the calculated sums, the rate of sampling r, and a threshold for filtering non-top hosts if any of the sums do not overflow in the estimating.

2. The system of claim 1, wherein the filter further comprises:
a sampler configured to sample the arrival packets of the flows and map each sampled packet into a value associated with a flow ID of the arrival packets,
an accounter configured with a plurality of counters for recording the mapped value, and
a determiner configured to determine whether the flows satisfy said constraint based on the mapped value, and remove the flows if said constraint is not satisfied.

3. The system of claim 2, wherein said constraint is set such that the determiner removes the flows associated with the value when the value is larger than a predetermined sampling threshold, and the determiner triggers the accounter to update the counters therein when the value is not larger than the predetermined sampling threshold.

4. The system of claim 2, wherein the accounter operates to update the counters therein by rule of:
if the value of the counter associated with the mapped value in the plurality of counters is no greater than q, said counter will increase by one,
where q represents a user specified parameter for characterizing small flows of no more than q packets.

5. The system of claim 2, wherein the data structure in the tracker comprises:
a hash table having a plurality of nodes; and
a min-heap,
wherein a key of each node in the hash table is host ID, and a value of each node in the hash table refers to a position of a node in the min-heap.

6. The system of claim 5, wherein each node in the min-heap comprises a field of host ID, a field of count, and a field of error of count, and
wherein the tracker further comprises a detector configured to detect the change of counters in the accounter so as to update the field of count and error in the min-heap.

7. The system of claim 6 wherein the detector is further configured to update the field of count in the min-heap by rule of If $c_t[h_m(f)]=i$ and $i \leq q$, $count_s = count_s + U_{i,q}(t)$ wherein $U_{i,q}(t)$ is set forth by rule of $$Y_{q-1,q} = \frac{m}{y_0},$$

$$Y_{q-2,q} = -1 \times \left[Y_{q-1,q} \times \frac{y_1}{y_0}\right],$$

$$Y_{q-3,q} = -1 \times \left[Y_{q-2,q} \times \frac{y_1}{y_0} + Y_{q-1,q} \times \frac{y_2}{y_0}\right],$$

$$Y_{q-i,q} = -1 \times \left[\sum_{j=1}^{i-1} Y_{q-(i-j),q} \times \frac{y_j}{y_0}\right],$$

$$\ldots$$

$$Y_{0,q} = -1 \times \left[\sum_{j=1}^{q-1} Y_{j,q} \times \frac{y_j}{y_0}\right].$$

$$U_{0,q} = m/y_0 - Y_{0,q+1},$$

$$U_{i,q} = -Y_{i,q+1}, 1 \leq i \leq q.$$

where $y_i$ represents number of counters in the accounter with value i,
q represents a user specified parameter for characterizing small flows of no more than q packets,
m represents the number of counters in the accounter,
$c_t[h_m(f)]$ is the value of the counter associated with the flow with ID f in the accounter,
$count_s$ represents the value of the counter associated with the host with ID s in the min-heap.

8. The system of claim 1, wherein the tracker further comprises:
a selector configured to determine the first set of hosts from the plurality of hosts in terms of the first estimated flow counts, wherein the estimated flow counts are determined based on a difference between a count and a count error for each host based on the received packets.

9. The system of claim 1, wherein the estimator further comprises:
a plurality of counters configured to record information of flow count for the first set of hosts; and
an updater configured to update the information on the plurality of counters.

10. The system of claim 9, wherein the estimator (30) further comprises:
a selector (303) configured to select three counters from a plurality of counters, and
wherein the updater (304) is further configured to update the selected counters by
For i=1 to 3

If $M_{h_i(s)}[h_w(f)] \leq q$, $M_{h_i(s)}[h_w(f)] = M_{h_i(s)}[h_w(f)] + 1$ where $M_{h_i(s)}[h_w(f)]$ is a selected counter from the plurality of counters, and q represents a user specified parameter for characterizing small flows of no more than q packets.

11. The system of claim 10, wherein the estimator further comprises:
an estimator configured to estimate flow counts from the determined first set of hosts based on the numbers in the selected counters.

12. A method for catching top hosts from a plurality of hosts, comprising:
sampling a plurality of packets from the hosts during a determined interval of time;
determining a difference between a count and a count error for each of the hosts based on the sampled packets;
ranking the hosts based on the determined difference to identify a first set of hosts in the ranked hosts;
estimating a flow count for each of the first set of hosts; and
selecting a second set of hosts from the first set of hosts as the top hosts, based on the estimated flow count,
wherein the estimating further comprises:
calculating a plurality of sums from a plurality of counters;
determining whether any of the sums overflow;
estimating the flow count based on the determined difference and a rate of sampling r if any of the sums is determined overflow in the estimating; and
estimating the flow count based on counts in the plurality of counters, the calculated sums, the rate of sampling r, and a threshold for filtering non-top hosts $T_2$ if any of the sums do not overflow in the estimating.

13. A system for catching top hosts, comprising:
a flow filter configured to test whether a packet in a flow from a plurality of hosts satisfies a predetermined constraint;
a tracker configured to get a plurality of candidate hosts with estimated flow counts thereof based on the test;

an estimator configured to select the top hosts from the candidate hosts and output the selected hosts ranked by the estimated flow counts thereof;

wherein each estimated flow count is determined by:
calculating a plurality of sums from a plurality of counters;
determining whether any of the sums overflow;
estimating the flow count based on the determined difference and a rate of sampling r if any of the sums are determined to overflow; and
estimating the flow count based on counts in the plurality of counters, the calculated sums, the rate of sampling r, and a threshold for filtering non-top hosts if any of the sums do not overflow in the estimating.

14. The system of claim 13, wherein the flow filter further comprises a sampling module configured to sample flows to be processed.

15. A method for catching top hosts, comprising:
testing whether a packet in a flow from one of a plurality of hosts satisfies a predetermined constraint;
getting candidate hosts with estimated flow counts thereof based on the testing;
selecting a plurality of top hosts from the candidate hosts and update the estimated flow counts thereof; and
outputting the selected top hosts ranked by the estimated flow counts thereof;
wherein each estimated flow count is determined by:
calculating a plurality of sums from a plurality of counters;
determining whether any of the sums overflow;
estimating the flow count based on the determined difference and a rate of sampling r if any of the sums are determined to overflow; and
estimating the flow count based on counts in the plurality of counters, the calculated sums, the rate of sampling r, and a threshold for filtering non-top hosts if any of the sums do not overflow in the estimating.

16. The method of claim 15, further comprising prior to the testing:
sampling the flow; and
removing the flow if it does not satisfy the predetermined constraint.

17. A system for catching top hosts, comprising:
a tester for testing whether a packet in a flow from a plurality of hosts satisfies a predetermined constraint;
an estimator for getting a plurality of candidate hosts with estimated flow counts thereof based on the test; and
a selector for selecting the top hosts from the candidate hosts and outputting the selected hosts ranked by the updated flow counts thereof;
wherein each estimated flow count is determined by:
calculating a plurality of sums from a plurality of counters;
determining whether any of the sums overflow;
estimating the flow count based on the determined difference and a rate of sampling r if any of the sums are determined to overflow; and
estimating the flow count based on counts in the plurality of counters, the calculated sums, the rate of sampling r, and a threshold for filtering non-top hosts if any of the sums do not overflow in the estimating.

18. The system of claim 17, wherein the tester further comprises:
a sampler for sampling the flow.

* * * * *